US007633176B1

(12) United States Patent
Blittersdorf

(10) Patent No.: US 7,633,176 B1
(45) Date of Patent: Dec. 15, 2009

(54) DIRECT DRIVE INDUCTION ELECTRICAL POWER GENERATOR

(75) Inventor: David C. Blittersdorf, Charlotte, VT (US)

(73) Assignee: Earth Turbines, Inc., Williston, VT (US)

( * ) Notice: Subject to any disclaimer, the term of this patent is extended or adjusted under 35 U.S.C. 154(b) by 415 days.

(21) Appl. No.: 11/205,386

(22) Filed: Aug. 17, 2005

(51) Int. Cl.
*F03D 9/00* (2006.01)
*H02P 9/00* (2006.01)

(52) U.S. Cl. .......................... 290/44; 290/55; 310/171; 322/47

(58) Field of Classification Search .................. 290/44, 290/55
See application file for complete search history.

(56) References Cited

U.S. PATENT DOCUMENTS

| | | | | |
|---|---|---|---|---|
| 1,633,166 A | * | 6/1927 | Davis | 290/7 |
| 2,431,223 A | * | 11/1947 | Ball | 310/169 |
| 3,361,953 A | * | 1/1968 | Neval | 322/95 |
| 3,860,858 A | | 1/1975 | Nola | |
| 3,940,646 A | * | 2/1976 | Buckman | 310/166 |
| 4,205,235 A | | 5/1980 | Pal et al. | |
| 4,242,628 A | | 12/1980 | Mohan et al. | |
| 4,291,233 A | * | 9/1981 | Kirschbaum | 290/1 C |
| 4,345,159 A | * | 8/1982 | Gutierrez Atencio | 290/43 |
| 4,388,585 A | * | 6/1983 | Nola | 322/47 |
| 4,408,958 A | * | 10/1983 | Schacle | 416/237 |
| 4,454,465 A | * | 6/1984 | Greene | 322/49 |
| 4,473,792 A | | 9/1984 | Nola | |
| 4,613,762 A | | 9/1986 | Soderholm | |
| 4,613,763 A | | 9/1986 | Swansen | |
| 5,029,288 A | | 7/1991 | Kubota et al. | |
| 5,295,793 A | * | 3/1994 | Belden | 416/13 |
| 5,315,159 A | * | 5/1994 | Gribnau | 290/55 |
| 5,406,190 A | | 4/1995 | Rosenberg | |
| 5,525,894 A | * | 6/1996 | Heller | 322/20 |
| 5,587,643 A | * | 12/1996 | Heller | 318/821 |
| 5,729,118 A | * | 3/1998 | Yanagisawa et al. | 322/29 |
| 5,986,438 A | * | 11/1999 | Wallace et al. | 322/20 |
| 6,020,725 A | * | 2/2000 | Roberts | 322/90 |

(Continued)

FOREIGN PATENT DOCUMENTS

DE    3629872 A  *  3/1988

(Continued)

OTHER PUBLICATIONS

Automatic translation of JP 10-225096 A to Osada et al., published Aug. 21, 1998.*

(Continued)

*Primary Examiner*—Joseph Waks
(74) *Attorney, Agent, or Firm*—Eric Spencer; James Marc Leas

(57) ABSTRACT

An electrical power generator is provided which is a direct drive induction generator capable of being directly connected to the power grid for the creation of electrical power. The rotor of the induction generator is located along the outside periphery of the stator and the stator may be provided with a plurality of poles. The number of poles provided on the stator may be adjusted to obtain an optimal rotational speed required to generate power. Using this arrangement, a low cost, efficient, reliable and easy to build wind generator may be provided.

35 Claims, 6 Drawing Sheets

U.S. PATENT DOCUMENTS

| | | | |
|---|---|---|---|
| 6,087,753 A * | 7/2000 | Pinkerton | 310/178 |
| 6,163,137 A * | 12/2000 | Wallace et al. | 322/20 |
| 6,285,090 B1 * | 9/2001 | Brutsaert et al. | 290/55 |
| 6,429,612 B1 | 8/2002 | Kume et al. | |
| 6,641,327 B1 * | 11/2003 | Lassila et al. | 405/78 |
| 6,815,934 B2 * | 11/2004 | Colley | 322/47 |
| 6,840,734 B2 * | 1/2005 | Hansen | 415/1 |
| 6,943,462 B2 * | 9/2005 | Wobben | 290/44 |
| 7,042,109 B2 * | 5/2006 | Gabrys | 290/44 |
| 7,330,016 B2 * | 2/2008 | Colley | 322/47 |
| 2007/0063677 A1 * | 3/2007 | Schauder | 322/29 |
| 2007/0102934 A1 * | 5/2007 | Pescarmona et al. | 290/44 |
| 2008/0007070 A1 * | 1/2008 | Edelson | 290/55 |
| 2008/0054733 A1 * | 3/2008 | Edelson | 310/42 |
| 2008/0309090 A1 * | 12/2008 | Stern et al. | 290/55 |

FOREIGN PATENT DOCUMENTS

| | | | |
|---|---|---|---|
| DE | 3638129 A | * | 5/1988 |
| DE | 3638129 A1 | * | 5/1988 |
| JP | 56151279 A | * | 11/1981 |
| JP | 59148597 A | * | 8/1984 |
| JP | 10225096 A | * | 8/1998 |

OTHER PUBLICATIONS

H. Wayne Beaty et al.. Electric Motor Handbook., 1998 edition. pp. 42, 105, 297, 298.*

Fax from Law Office of James M Leas dated Oct. 10, 2009.*

L. H. Hansen et al., "Conceptual survey of Generators and Power Electronics for Wind Turbines," Riso National Laboratory Roskilde, Denmark Dec. 2001 RISO-1205(EN).

Y. Amirat, et al. "Generators for Wind Energy Conversion Systems: State of the Art and Coming Attractions," J. Electrical Systems 3-1 (2007).

M. R. Dubois, "Review of Electromechanical Conversion in Wind Turbines," Report EPP00.R03, TU Delft, Faculty ITS, Group Electrical Power Processing, Mekelweg 4, 2628 CD Delft, Nederland, Kamer LB 03.660, Apr. 2000.

* cited by examiner

DIRECT DRIVE INDUCTION ELECTRICAL POWER GENERATOR

BACKGROUND OF THE INVENTION

This invention relates to an electrical power generator and more specifically relates to a direct drive induction type generator which may be adaptable for use as a wind generator.

Wind turbine generators are coming into more frequent use as an alternative electrical power source. Wind farms use induction generators to convert the rotary movement of a wind turbine to electrical power. The fact that the wind velocity is random, unpredictable and subject to rapid changes complicates the manner in which the generator is connected to the AC power mains.

Induction machines are inherently capable of operating either as generators or motors, depending on the rotational velocity of the prime mover drive. For velocities greater than the machine's synchronous speed, the machine will operate in a generating mode and provide a power output to the mains. However, for velocities below the synchronous speed, the machine will operate in a motoring mode and draw power from the mains.

With the rising costs of fuel and ongoing environmental concerns, there has been considerable effort to develop new sources of electrical power. Included has been the development of systems primarily designed for providing power to a household, with any excess generated power being fed back to a power line of a public utility providing a primary source of power for that household. Frequently, the auxiliary or local power generating unit is in the form of a wind turbine, and there are times when little or insufficient power is available from it alone. Thus, as a matter of convenience, in order to reserve a continuous interconnection of power to on-site electrical devices to be powered, the windmill and public utility power lines are connected together.

Wind turbine generators have typically been of the direct current type, and thus in order to achieve compatibility with public power lines, which are of alternating current power, the output of such a generator must be converted to alternating current power. This is accomplished by switching means operating synchronously with the frequency, typically 60 cycles, of the power line. In addition to effecting frequency compatibility, there must be both voltage amplitude and phase compatibility between the generated output and the power line voltage. All in all, such a coupling system is necessarily complex and costly and reduces the overall system efficiency.

As an alternate to the direct current generator, induction motor/generator units are sometimes used with windmill generating systems. While the induction motor/generator has not seen great use as a generator in the past, it is perhaps the most widely used type of motor, and thus is widely available and at a reasonable cost.

The power input to an induction motor is given by the product of the applied voltage, the current, and the cosine of the phase angle between the voltage and current (E I Cosine a). In a heavily loaded motor, the current will tend to be in phase with the voltage. When unloaded, the current will typically lag the voltage 70 to 80 degrees. If an external force tends to drive the shaft higher than synchronous speed, the phase lag will continue to increase. When the force is sufficient to cause the phase lag to be 90 degrees, the power input to the motor is zero since cosine 90 degrees=0. At this point, the mechanical energy applied to the shaft is exactly equal to the magnetizing losses, and there is no net energy being generated. As the driving force continues to increase, the phase angle becomes greater than 90 degrees. The cosine of angles greater than 90 degrees is negative, indicating negative power flow. The motor is now generating power and returning energy to the buss. Further increase in driving force causes the phase lag to approach 180 degrees as the full generating capacity of the machine is reached.

Significantly, the induction generator requires no synchronization or voltage regulation circuitry to couple its output to a power line. It inherently functions as a generator when it is driven above its synchronization speed, a speed equal to the frequency of the power line divided by the number of pairs of poles that it contains, typically in the United States, the speed being 1,800 rpm in the case of a 4-pole device. It, like a direct current generator, is typically connected to a power line when its speed is sufficient for the production of power which, in the case of the induction motor/generator, is at sync speed. Beyond this speed, and in the range of approximately five percent of the sync speed, this type device provides increasing power output to a power line, this increase occurring as the phase lag of current with respect to voltage increases above 90 degrees, an angle which persists at the sync speed.

Prior art induction generators of this type typically employ a gearbox assembly to increase the speed of the rotor of the generator to match or exceed the synchronous speed to generate electricity. As mentioned above, for a 4-pole generator, the rotor must spin at 1800 rpm (7200/4=1800 rpm) to reach synchronous speed and begin to generate power. The use of a gearbox can be costly, add weight, require periodic maintenance, and reduce overall system efficiency.

As can be seen, there is a need for an improved power generator that harnesses the inherent abilities of an induction generator and also increases the overall power generation system efficiency so as to make power generation more cost effective.

SUMMARY OF THE INVENTION

In one aspect of the invention, an induction generator, adaptable for use in a wind turbine for the generation of electrical power is provided which comprises a stator having a plurality of wire windings, wherein the wire windings are disposed along an outside periphery of the stator. A rotor is provided which is configured to rotate in close proximity to the stator, and the rotor is disposed around the stator and the rotor rotational speed is substantially equal to the rotational speed of a blade or airfoil of the wind turbine.

In another aspect of the present invention, a wind turbine configured for the generation of electrical power is provide comprising a tower extending upwardly from and affixed to the ground. A generator assembly may be pivotally affixed to the top of the tower wherein the generator assembly is further comprised of at least one air foil configured to convert wind energy into rotational energy, a tail assembly configured to position the air foil in relation to the direction of the wind so as to maximize the conversion of wind energy into rotational energy. A direct drive induction generator is configured to be driven by the rotation of the air foil.

In yet a further aspect of the present invention, an electrical power generator is provided comprising a direct drive synchronous induction generator, the induction generator being comprised of a rotating rotor and a stationary stator, wherein the rotor is disposed in close proximity to an outside periphery of the stator, the stator further comprising a plurality of poles spaced along the outside periphery of the stator and the rotor induces a flow of electrical current within the plurality of poles as the rotor rotates.

These and other features, aspects and advantages of the invention will become better understood with reference to the following drawings, description, and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
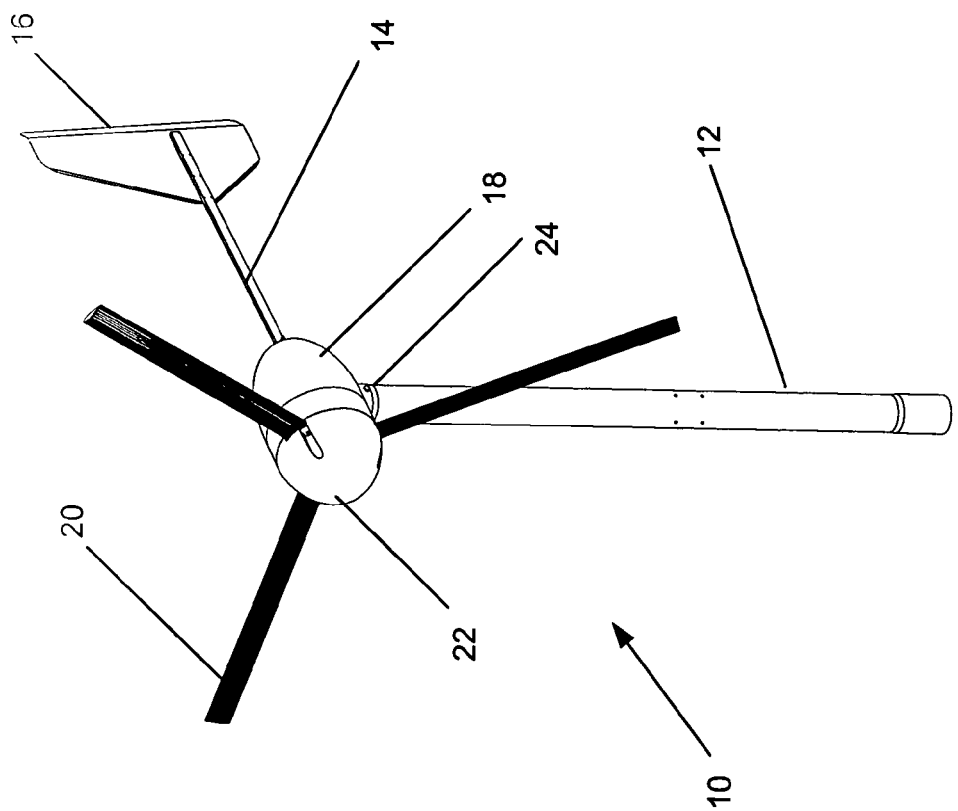
FIG. 1 is an isometric view of a typical wind turbine in accordance with the invention.
Figure 2:
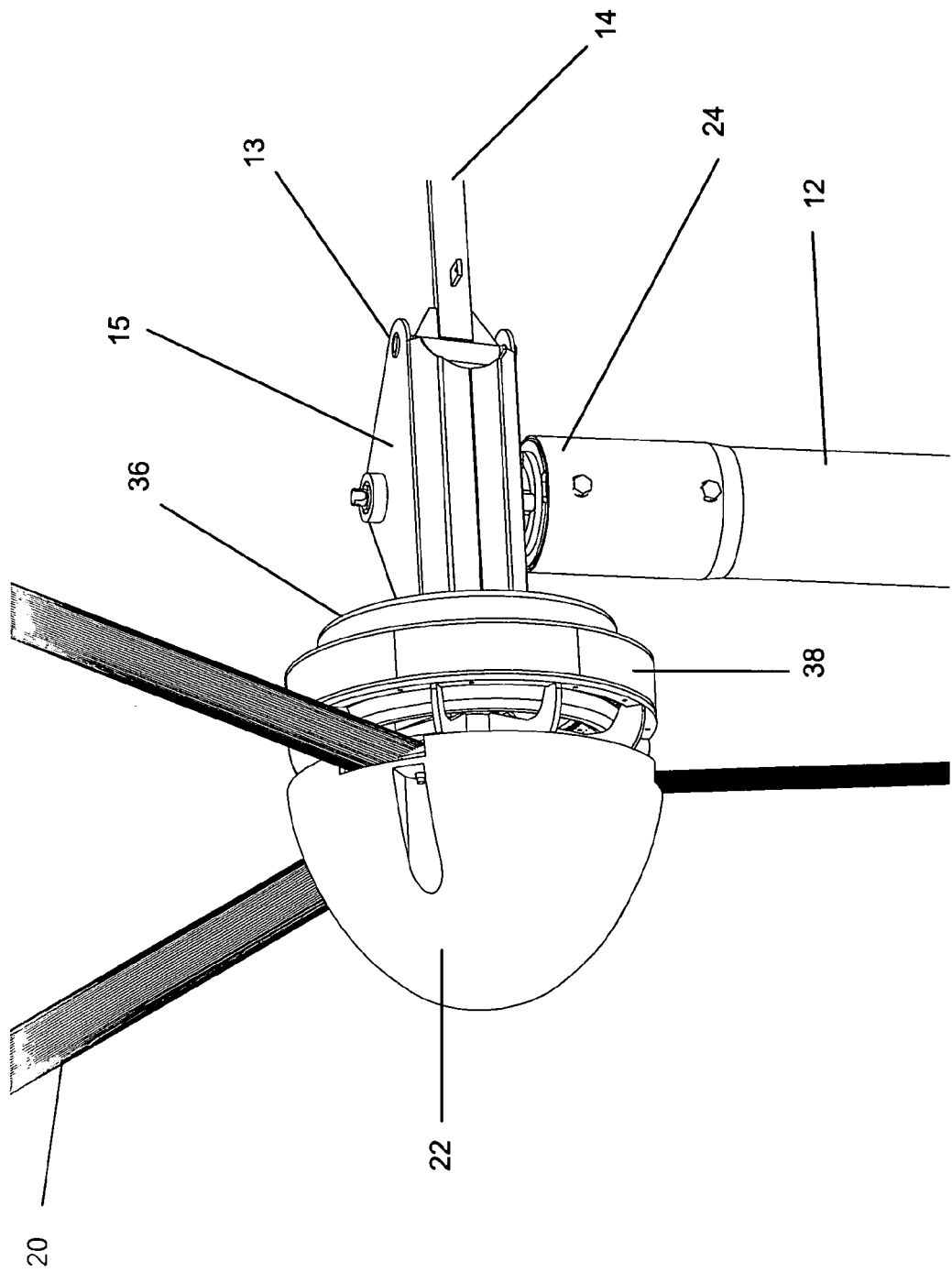
FIG. 2 is a close up isometric view of a typical wind turbine in accordance with the invention.

Referring first to FIGS. 1 and 2, which shows an isometric view of a wind turbine in accordance with the invention, a direct drive induction wind generator 10 may be pivotally disposed at the top distal end of tower 12 extending upwardly from the ground such that a plurality of airfoils or blades 20 may be acted upon by the wind. A fairing 18 may be provided to house the components of the generator 10 and also reduce aerodynamic forces and disturbances proximate to the airfoils 20. It should be noted, this particular embodiment depicts an upwind turbine design, which means a tail boom 14 is disposed on the wind generator 10 and a tail 16 is affixed to an end of the tail boom 14 to pivot the generator 10 and the airfoils 20 so that they face into the wind. Alternatively, a down wind configuration may be employed such that the airfoils 20 face downstream relative to the wind. There are also other means for aligning the airfoils 20 with the wind, and all such means are fully contemplated by the invention.

A tail pivot 13 (FIG. 2) may be provided which is configured to allow the generator 10 to pivot out of the wind at a predetermined wind speed to protect the wind turbine from damage in the event of high winds. A pivot 24 may be provided at the top distal end of the tower 12, which is configured to allow the generator 10 to rotate as required to properly align with the wind. A nose cone 22 may be provided adjacent the airfoils 20 to further reduce drag and turbulence and also reduce wind disturbances near the generator 10.

Referring again to FIG. 2, which shows a close up view of the generator 10 with the fairing 18 removed, the internal components of the generator 10 can be seen. A stator 36 may be affixed to a tower fitting 15 in any well known manner. The stator 36 may be disposed internal to a rotor 38. The rotor 38 may be affixed to the plurality of airfoils 20 in any well known manner, and may be configured to rotate at the same speed as the airfoils 20. This is generally termed a "direct drive" generator, because no gear box or belt and pulley arrangement is employed to reduce or increase the speed of the rotor 38 in relation to the airfoils 20. Elimination of these drive components greatly simplifies the generator, reduces the cost to produce and maintain the generator, and increases the generator's reliability significantly.

Figure 3:
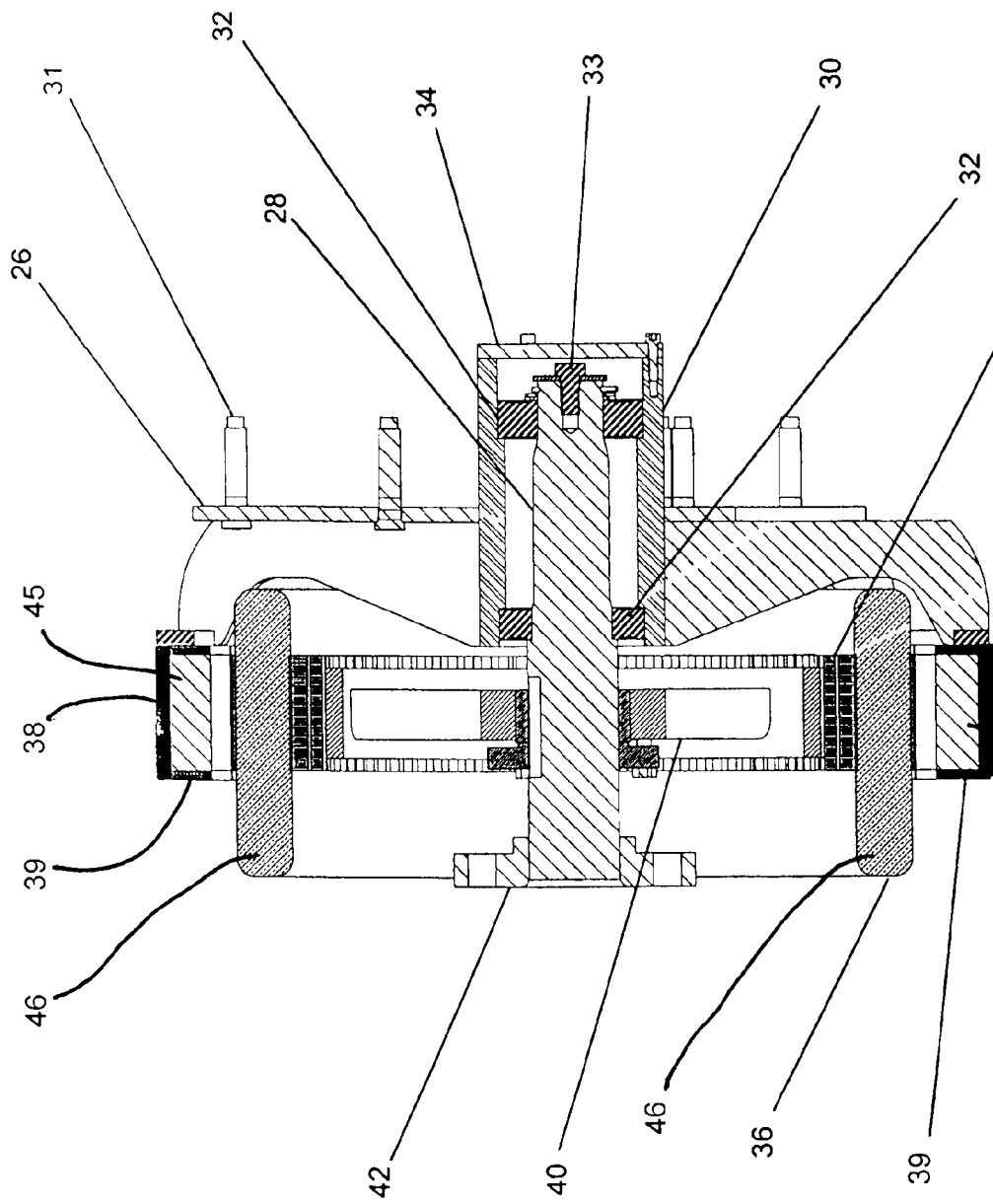
FIG. 3 is a side sectional view of a generator in accordance with the invention.
Figure 4:
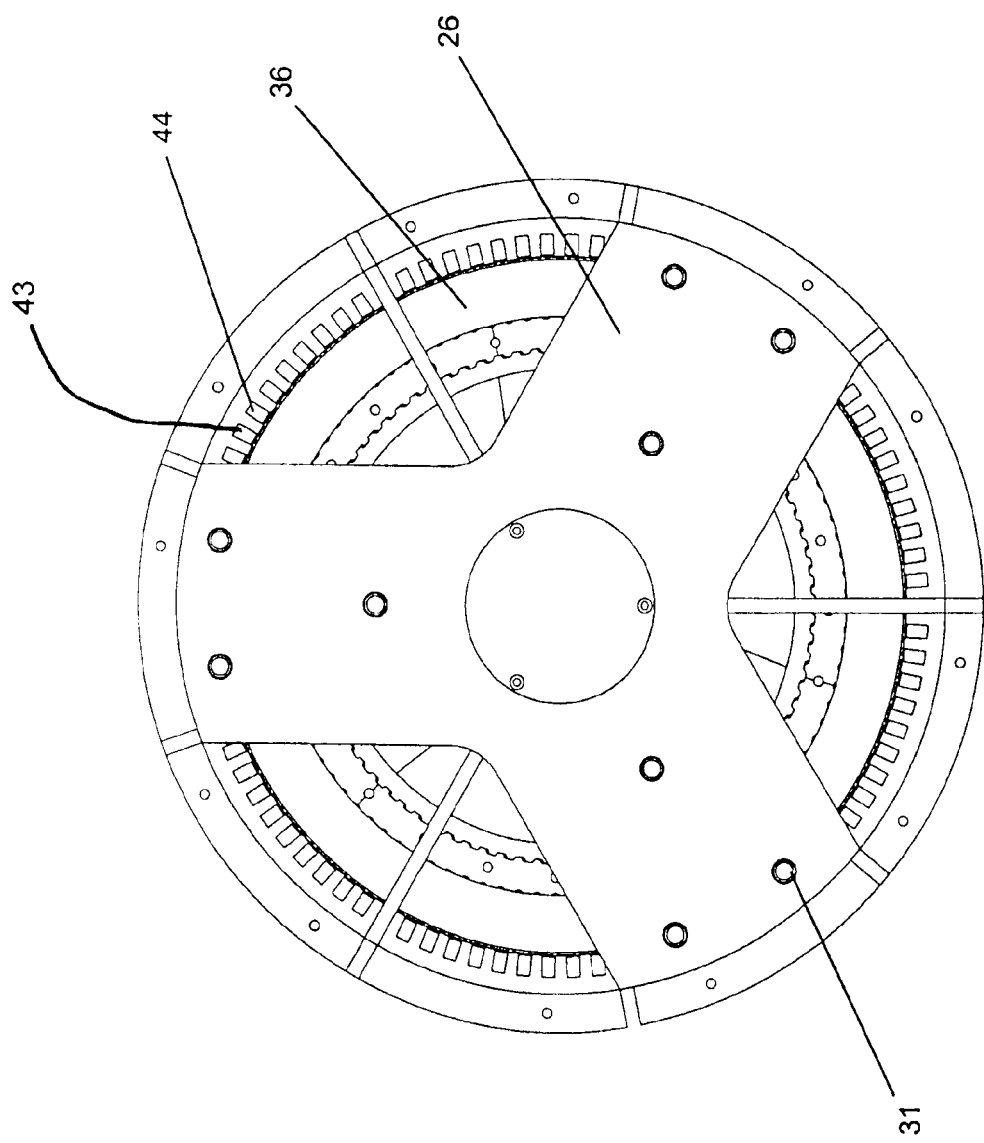
FIG. 4 is a front plan view of a generator in accordance with the invention.

Referring now to FIGS. 3 and 4, which shows a side sectional and front view respectively of the generator 10, the inner workings of the generator 10 will now be described in more detail. A fixed stator 36 is rigidly affixed to a main shaft 28. The main shaft 28 may extend coaxially through the center area of the cylindrical stator 36. The main shaft 28 may be affixed to the tower fitting 15 (FIG. 2) by means of a mounting flange 42. A plurality of mounting holes may be provided in mounting flange 42 for the insertion of hardware fasteners to rigidly affix the main shaft 28 to the tower fitting 15. A hub plate 26 may be coaxially affixed to a bearing housing 30 by any well known means. The bearing housing 30 is configured to be installed onto the main shaft 28 and may interface with a pair of bearings 32. The bearings 32 may be configured to reduce the rotational friction between the main shaft 28 and the hub plate 26 as the hub plate rotates about the main shaft 28. A bolt and washer 33 may be inserted into an end of the main shaft 28 to retain one of the bearings 32. A bearing cap 34 may be affixed to and seal the open end of the bearing housing 30.

A plurality of mounting studs 31 protrude from the hub plate 26. The mounting studs 31 may be configured to interface with and affix a typical air foil 20 to the hub plate 26 such that the hub plate 26 will rotate due to wind forces acting on the air foils 20. As mentioned previously, since this is a direct drive generator, the rotational speed of the air foils 20 is equal to the rotational speed of the hub plate 26 and thusly the rotational speed of the rotor 38.

The rotor 38 is affixed to the hub plate 26 such that it may rotate along the major axis of the main shaft 28 in close proximity to the outside periphery of the stator 36. The space between the stator 36 and the rotor 38 is a critical dimension that is important to the overall efficiency of the generator 10. In addition, the placement of the rotor 38 to the outside of the stator 36 allows the number of poles 44 provided in the rotor 38 to be easily modified to arrive at an optimum generator performance for a given wind speed situation.

As mentioned previously, an induction generator as described herein requires no synchronization or voltage regulation circuitry to couple its output to a power line. It inherently functions as a generator when it is driven above its synchronization speed, a speed equal to the frequency of the power line divided by the number of pairs of poles that it contains. Therefore, by changing the number of poles 44 in the rotor 38, the synchronous speed of the generator 10 can be modified to match a given wind speed condition for a given site location. This allows the generator 10 to operate at its optimum rotational speed and will greatly increase the amount of electricity generated at a given site.

For example, the rotational speed of an induction generator is determined by the following formula: RPM=7200/number of poles. Therefore, if a generator has for example, 32 poles, the rotational speed of the generator will be 7200/32=225 rpm. Using this relationship, the rotational speed of the generator can be altered by adding or removing the number of poles 44.

Early generation wind turbines often used mechanical gear assemblies to match the speed of the slow turning airfoils to the high speed required by a conventional induction generator to produce line frequency (60 Hz) power. Conventional motors and generators will typically operate at 1200-3600 rpm. Air foil aerodynamics dictates that optimal rotational speed for a 1-20 kW power generator be approximately 90-450 RPM. Rotational speed of the airfoils is inversely proportional to the airfoil diameter. Double the airfoil diameter, the rotational speed of the airfoil is cut in half. This relationship therefore requires that the rotational speed of the airfoils be increased through the use of gear boxes or sprockets and chains or the like. Mechanical speed increasers such as these have many disadvantages and should be avoided if possible. These disadvantages include increased cost, reduced reliability, increased service calls, lower efficiency, and a significant increase to the weight aloft, which increases the structural requirements during assembly and erection of the wind turbine system.

The rotor 38 may be a typical squirrel cage type rotor which is comprised of a pair of copper rings 39 located at each face of the rotor 38. The pair of copper rings 39 may be interconnected along their outside circumference by a plurality of electrically conductive bars 43 spaced along the periphery of the copper rings 39. A squirrel cage rotor is the rotating part commonly used in induction generators such as described here. In overall shape it may be cylindrical and mounted on the main shaft 28. Internally it contains longitudinal conductive bars 43 usually comprised of aluminum or copper set into grooves and connected together at both ends by the copper rings 39 forming a cage-like shape.

The core of the rotor 38 may be built of a stack of iron laminations 45. A plurality of field windings 46 configured to create a plurality of electromagnets in the stator 36 set up a rotating magnetic field around the rotor 38. The relative motion between this field and the rotation of the rotor 38 induces electrical current flow in the conductive bars 43. The iron laminations 45 serve to carry the magnetic field across the generator. In structure and material the laminations 45 are designed to minimize losses. The thin laminations, which may be separated by varnish insulation, reduce stray circulating currents that may result in eddy current loss. The material may be a low carbon but high silicon iron with several times the resistance of pure iron, further reducing eddy-current loss. The low carbon content makes it a magnetically soft material with low hysteresis loss.

Figure 6:
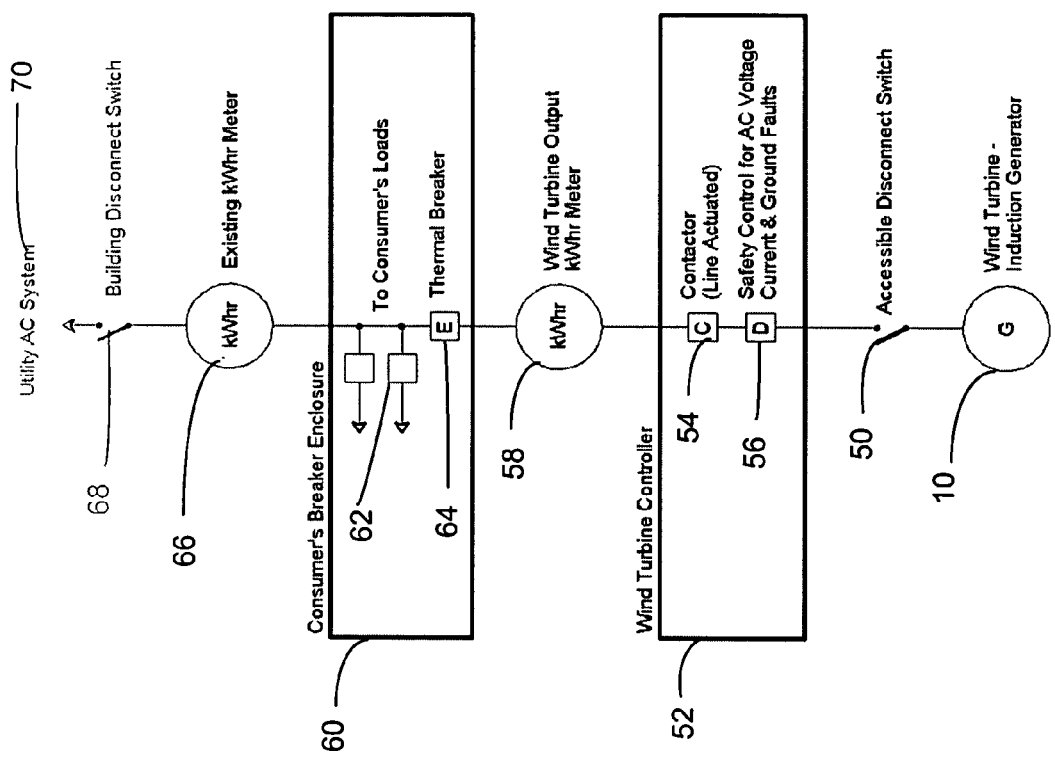
FIG. 6 is a simplified electrical schematic in accordance with the invention.

Referring now to FIG. 6, which depicts a simplified electrical schematic of a typical wind turbine installation in accordance with this invention, the generator 10 is first connected to a wind turbine disconnect switch 50. The disconnect switch 50 should be easily accessible so that the generator may be quickly and easily electrically disconnected for safety reasons while the turbine is being serviced. The disconnect switch 50 is then connected to the controller 52. Housed inside the controller 52 is a line actuated contactor 54 and a current and ground fault safety control 56. The controller 52 may be of the type described in U.S. Pat. No. 3,860,858 to Nola, which is incorporated herein by reference. The controller 52 may be a variable frequency inverter for controlling an induction generator which varies the voltage in response to varying torque requirements so that the applied voltage amplitude are of optimal value for any load and speed requirement. During operation below synchronous speed the controller 52 will sense the rotation speed of the generator. As the wind speed increases, and the generator output approaches the line frequency (60 Hz), the controller 52 will begin to synchronize the generator output to the line frequency. At synchronous speed, the controller 52 will increase the voltage level to cause power to be generated by the generator 10 and feed the power to the electrical grid. As the wind speed increases, the voltage level will continue to increase leading to the generation of more power which loads the generator 10 to keep it synchronized to the electrical grid frequency. It should also be noted that as the wind speed increases, the angle of attack of the air foils 20 with respect to the wind may change causing the airfoils 20 to become less aerodynamic which will also act to control the rotational speed of the generator 10.

As mentioned previously, the controller 52 utilizes a power factor controller to adjust the voltage level of the generator 10. An induction generator operating at greater than synchronous speed (+percent slip) will produce a lagging power factor less than one, which should be controlled. By reducing the voltage to a less than fully loaded generator 10, the power factor and thus the generator efficiency is improved while operating at less than full power. In this manner, the controller 52 is configured to maximize the overall performance of the generator 10.

Connected to the controller 52 may be a wind turbine electrical meter 58 which may be configured to measure the amount of electrical power generated by the generator 10. Connected to the meter 58 may be a breaker enclosure 60 which may house the connections to a plurality of loads 62, such as lights, cooling machines, etc. typically found in a consumer's home. This is the connection where the owner of the generator 10 would reap the benefits of the power generated by the generator 10 because it would reduce or eliminate the need to purchase power from the utility. Also housed in the breaker enclosure 60 may be a thermal breaker 64 which is configured to protect the system due to overheating of the components.

Connected to the breaker enclosure 60 may then be an electrical meter 66 which is configured to measure the power used by the consumer that is provided by the utility, or, if enough power is generated, it could measure the amount of power that is transmitted to the utility at block 70. Finally, a building disconnect switch 68 is provided between the utility system at block 70 and the meter 66 which is configured to electrically connect/disconnect the generating system as may be required. Thus, FIG. 6 depicts a simplified generating system that may be required to both generate power with the generator 10 and obtain power from a utility 70.

Figure 5:
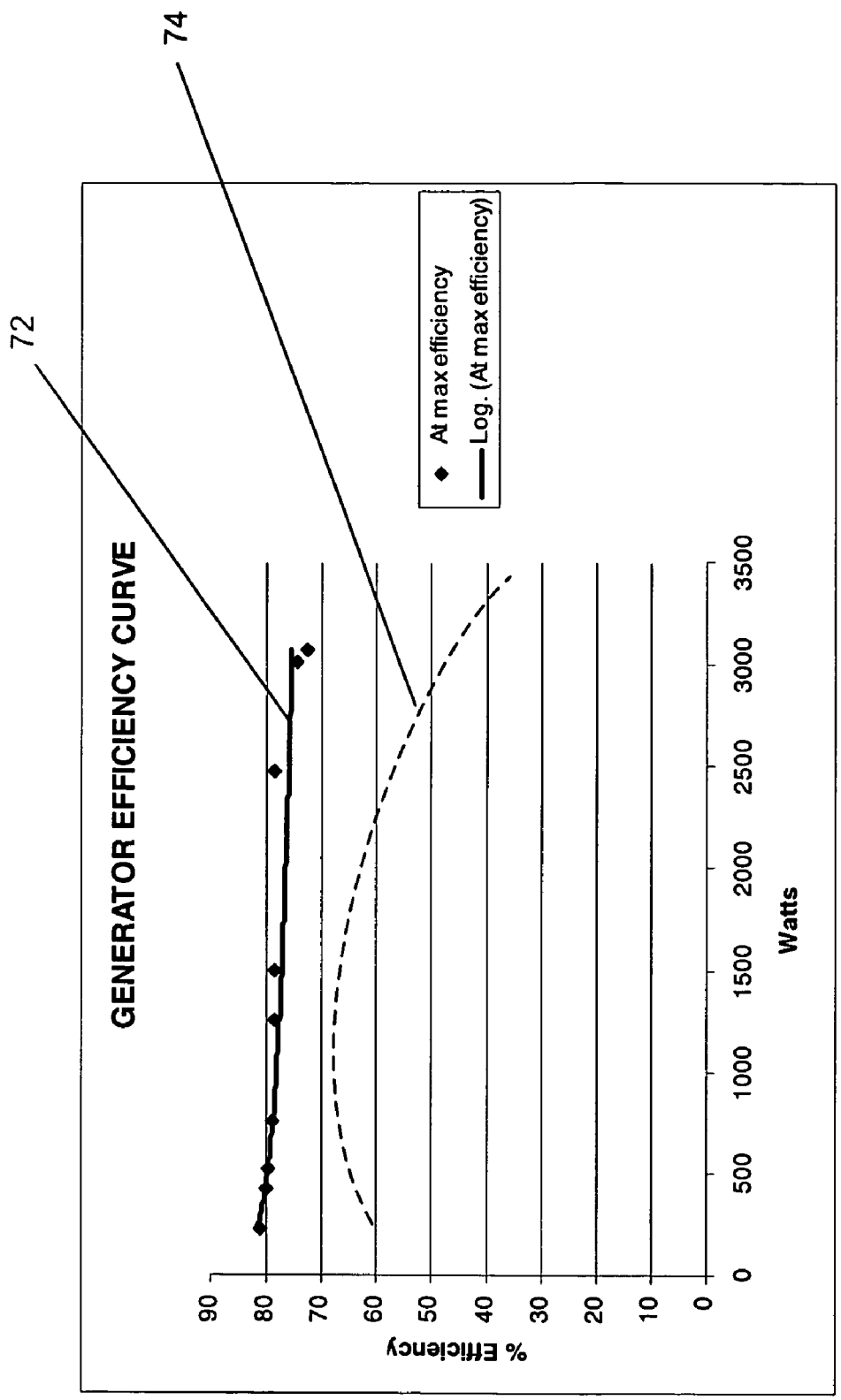
FIG. 5 is curve representing the power generating efficiency of a wind turbine in accordance with the invention.

Referring now to FIG. 5, which depicts a representative efficiency curve of a generator system in accordance with the invention which is configured to generate in the 3 kW range. The curve 72 clearly shows, based upon actual experimental measurements, the efficiency of the generator 10 is almost constant between 70-80% regardless of the actual power generation level. This efficiency performance is in stark contrast to the performance of a typical generator as shown by curve 74. This improved efficiency performance translates into the generation of more power at a range of wind speeds, thereby increasing the output of the generator 10.

It should be understood, of course, that the foregoing relates to preferred embodiments of the invention and that modifications may be made without departing from the spirit and scope of the invention as set forth in the following claims.

I claim:

1. An energy generator, comprising an induction generator and a rotatable air foil, wherein said rotatable air foil is configured to convert wind energy into rotational energy, wherein said induction generator includes a rotor that is directly driven by said rotatable air foil so rotational speed of said rotor is substantially equal to rotational speed of said rotatable air foil, wherein said induction generator includes a sufficient number of poles to generate power when said rotatable air foil is rotating at a speed in the range from 90 RPM to 450 RPM, wherein said induction generator includes more than 15 poles.

2. An energy generator as recited in claim 1, further comprising two additional rotatable air foils, wherein said induction generator includes a rotor that is directly driven by said three rotatable air foils so rotational speed of said rotor is substantially equal to rotational speed of said three rotatable air foils.

3. An energy generator as recited in claim 2, further comprising a hub plate, wherein said air foils are supported by said hub plate.

4. An energy generator as recited in claim 1, wherein said induction generator includes fewer than 81 poles.

5. An energy generator as recited in claim 1, wherein said induction generator includes 32 poles.

6. An energy generator as recited in claim 1, further comprising a stator, wherein said stator includes said poles.

7. An energy generator as recited in claim 6, wherein said rotor is located outside said stator.

8. An energy generator as recited in claim 7, further comprising a main shaft, wherein said stator is rigidly fixed to said main shaft and wherein said rotor is supported by said main shaft through bearings.

9. An energy generator as recited in claim 6, wherein said rotor comprises a squirrel cage rotor.

10. An energy generator as recited in claim 6, wherein each said pole includes three phase windings to provide for 3-phase power.

11. An energy generator as recited in claim 6, wherein said rotor includes a laminated stack of ferrous rings mounted between conductive rings.

12. An energy generator as recited in claim 11, wherein said rotor further includes conductive bars extending between said conductive rings.

13. An energy generator as recited in claim 12, wherein said conductive rings include at least one from the group consisting of aluminum and copper.

14. An energy generator as recited in claim 1, further comprising a structure to prevent damage when said rotatable air foil is driven by excessive torque.

15. An energy generator as recited in claim 1, further comprising an electrical power grid, wherein said induction generator is for connection to said electrical power grid.

16. An energy generator as recited in claim 1, further comprising a controller, wherein said controller varies AC voltage provided to said induction generator based on torque provided to said rotatable air foil.

17. An energy generator as recited in claim 1, wherein said rotatable air foil is configured to rotate about a substantially horizontal axis.

18. An energy generator, comprising an induction generator and a rotatable air foil, wherein said rotatable air foil is configured to convert wind energy into rotational energy, wherein said induction generator includes a rotor that is directly driven by said rotatable air foil so rotational speed of said rotor is substantially equal to rotational speed of said rotatable air foil, wherein said induction generator includes more than 15 poles.

19. An energy generator as recited in claim 18, further comprising two additional rotatable air foils s, wherein said induction generator includes a rotor that is directly driven by said three rotatable air foils s so rotational speed of said rotor is substantially equal to rotational speed of said three rotatable air foils.

20. An energy generator as recited in claim 18, further comprising a hub plate, wherein said air foil is supported by said hub plate.

21. An energy generator as recited in claim 18, wherein said induction generator includes fewer than 81 poles.

22. An energy generator as recited in claim 18, wherein said induction generator includes 32 poles.

23. An energy generator as recited in claim 18, further comprising a stator, wherein said stator includes said poles.

24. An energy generator as recited in claim 23, wherein said rotor is outside said stator.

25. An energy generator as recited in claim 18, wherein said rotor comprises a squirrel cage rotor.

26. An energy generator as recited in claim 18, further comprising an electrical power grid, wherein said induction generator is for connection to said electrical power grid.

27. An energy generator as recited in claim 18, further comprising a main shaft, wherein said stator is rigidly fixed to said main shaft and wherein said rotor is supported by said main shaft through bearings.

28. An energy generator as recited in claim 18, wherein each pole includes three phase windings to provide for 3-phase power.

29. An energy generator as recited in claim 18, wherein said rotor includes a laminated stack of ferrous rings mounted between conductive rings.

30. An energy generator as recited in claim 29, wherein said rotor further includes conductive bars extending between said conductive rings.

31. An energy generator as recited in claim 29, wherein said conductive rings include at least one from the group consisting of aluminum and copper.

32. An energy generator as recited in claim 18, air foil s include further comprising a structure to prevent damage when said air foil s are driven by high wind.

33. An energy generator as recited in claim 18, further comprising a structure to prevent damage when said air foil is driven by excessive torque.

34. An energy generator as recited in claim 18, further comprising a controller, wherein said controller varies AC voltage provided to said induction generator based on torque provided to said rotatable air foil.

35. An energy generator as recited in claim 18, wherein said rotatable air foil is configured to rotate about a substantially horizontal axis.

* * * * *